(12) United States Patent
Sugarev

(10) Patent No.: US 11,329,931 B2
(45) Date of Patent: May 10, 2022

(54) CONFIGURABLE HTTP REQUEST THROTTLING LIBRARY

(71) Applicant: SAP SE, Walldorf (DE)

(72) Inventor: Radoslav Ivanov Sugarev, Sofia (BG)

(73) Assignee: SAP SE, Walldorf (DE)

( * ) Notice: Subject to any disclaimer, the term of this patent is extended or adjusted under 35 U.S.C. 154(b) by 94 days.

(21) Appl. No.: 16/700,587

(22) Filed: Dec. 2, 2019

(65) Prior Publication Data

US 2021/0168091 A1    Jun. 3, 2021

(51) Int. Cl.
| | | |
|---|---|---|
| *H04L 12/923* | (2013.01) | |
| *H04L 29/08* | (2006.01) | |
| *H04L 47/762* | (2022.01) | |
| *H04L 47/70* | (2022.01) | |
| *H04L 67/02* | (2022.01) | |
| *H04L 47/80* | (2022.01) | |
| *H04L 47/783* | (2022.01) | |

(52) U.S. Cl.
CPC .......... *H04L 47/762* (2013.01); *H04L 47/783* (2013.01); *H04L 47/801* (2013.01); *H04L 47/827* (2013.01); *H04L 67/02* (2013.01)

(58) Field of Classification Search
CPC ... H04L 47/762; H04L 47/783; H04L 47/801; H04L 47/827; H04L 67/02
USPC ........................................................ 370/232
See application file for complete search history.

(56) References Cited

U.S. PATENT DOCUMENTS

| | | | |
|---|---|---|---|
| 2003/0135639 A1* | 7/2003 | Marejka ................. | H04L 47/10 709/232 |
| 2019/0182168 A1* | 6/2019 | Bastide ................... | H04L 47/24 |
| 2020/0142465 A1* | 5/2020 | Jenne ..................... | G06F 1/3287 |
| 2020/0374365 A1* | 11/2020 | Gandhi ................ | H04L 63/0236 |

OTHER PUBLICATIONS

Sanda, J., "RHQ Request Throttling," printed Nov. 29, 2019 from https://docs.jboss.org/author/display/RHQ/Request+Throttling?_sscc-14, 3 pages, Feb. 4, 2014.
"Throttling pattern," Microsoft Azure, printed Nov. 29, 2019 from https://docs.microsoft.com/en-us/azure/architecture/patters/throttling, 7 pages, Jun. 22, 2017.

* cited by examiner

*Primary Examiner* — Faisal Choudhury
(74) *Attorney, Agent, or Firm* — Sterne, Kessler, Goldstein & Fox P.L.L.C.

(57) ABSTRACT

Disclosed herein are system, method, and computer program product embodiments for deploying a configurable throttling library in a cloud platform that throttles requests according to fully customizable parameters across each origin and resource. An administrator can harness the full customization provided by the throttling library to specify increment, decrement, delay, threshold, expiration, and rejection policies. These policies allow administrators to specify parameters guiding throttling on a per-user and a per-resource basis, thus providing significantly enhanced configuration capabilities to the administrator to tailor the throttling to the unique requirements of their applications and the usage thereof.

20 Claims, 5 Drawing Sheets

CONFIGURABLE HTTP REQUEST THROTTLING LIBRARY

BACKGROUND

A cloud platform may allow customers to create, deploy, and manage customized software applications. The cloud platform may access various resources such as backend data systems, data storage solutions, web applications, and services. Demand for the software applications typically oscillates over time, with the cloud platform experiencing periods of high access and usage. The nature, character, and frequency of these periods of high utilization may vary by customer and resource. To avoid poor performance during such periods, a cloud platform may throttle requests to minimize the impact during peak load and to ensure that system outages do not occur.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
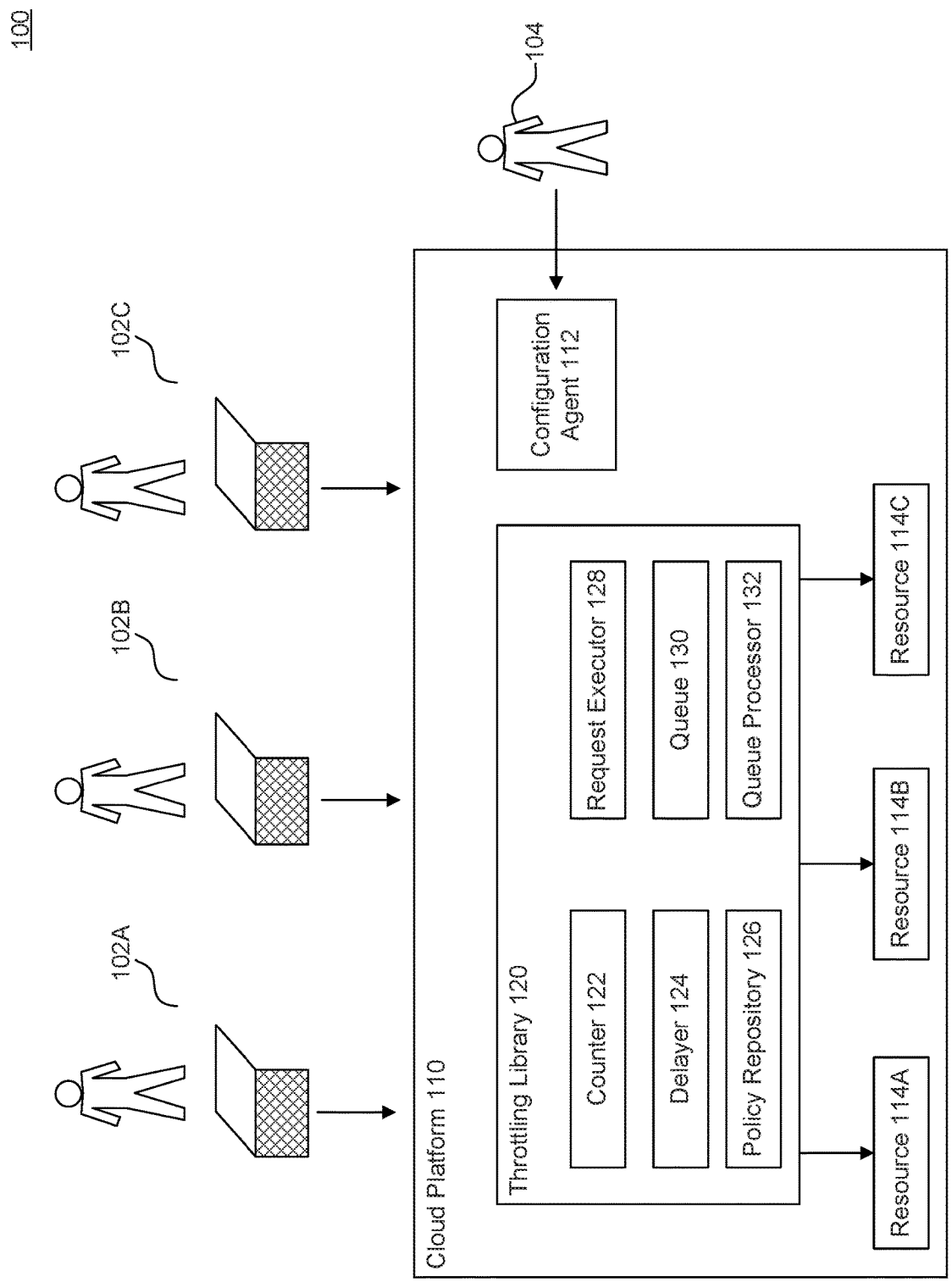
FIG. 1 is a block diagram of a cloud computing environment, according to some embodiments.

Provided herein are system, apparatus, device, method and/or computer program product embodiments, and/or combinations and sub-combinations thereof, for deploying a configurable throttling library in a cloud platform that throttles requests according to parameters that are fully customizable across each origin and resource.

A cloud platform may allow organizations and individuals to build, deploy, and maintain software applications. Generally speaking, an application may be a user interface, device, application, or other system that derives, assembles, collects, manipulates, stores, and/or archives data and presents this data in an appropriate fashion to users. The range, nature, and character of such applications is vast, and such software applications are harnessed across multitudinous industries, services, trades, and pursuits. A cloud platform may advance a software-as-a-service model, providing organizations with hardware components, e.g., application servers, databases, routers, load balancers, etc., management services, e.g., hosting, data storage, analytics, machine learning, etc., and other suitable software components. By managing the infrastructure and providing configuration tools with a cloud platform, an organization may rapidly build, deploy, maintain, and update customized software applications.

A cloud platform may access a variety of backend systems, data storage solutions, services, web applications, servers, etc. that will be referred to as resources in the below disclosure. The cloud platform may access these resources through an appropriate application programming interface (API) or other suitable access methodology. Each resource may have different performance capabilities, usage patterns, requirements for access, etc. In an embodiment, a resource may be housed on a server that provides protected data or services to a requestor in response to a resource request. In such an embodiment, an authorization server may authenticate and process requests from various origins to resource servers.

System performance may be a paramount concern to organizations leveraging a cloud computing platform. Poor system performance may frustrate users of the software applications hosted in the cloud platform. System unavailability may cause organizations to fail to meet service level agreements and other contractual obligations. During periods of high usage, performance may suffer if the demand exceeds the capabilities of the resource servers and/or associated network components, e.g., CPU, memory, bandwidth, etc.

Usage of an application hosted in a cloud platform may also vary over time according to the application and the customers thereof, i.e., one application may experience peak load at very different times and at differing frequencies than a second application. For example, an application that allows users to make holiday-shopping lists may experience peak usage during the month of December while being used at lower levels throughout the rest of the year. For another example, an application that provides weather reports may experience the highest load during the morning, but lower usage during the evening hours. Or an application that offers a sweepstakes every day at 5 PM may experience a huge spike in usage right at 4:59 PM and remain otherwise unused. Server load may also vary based on the types of activities that users are performing on a cloud platform. For example, monthly billing reports may be generated by an organization at the end of a month, and the generation of such reports may be computationally demanding as compared to other behaviors.

Various strategies exist to deliver systems that can fulfill these varied usage patterns. One solution to improve performance is to furnish additional components and hardware, however, this is often cost-inefficient, consuming, and unnecessary during periods of ordinary usage. Throttling provides an alternative approach to maintain system performance during periods of high usage. By employing throttling, a cloud platform curtails users' access to resources at certain times and/or based on users' behaviors. Such an approach allows the total system to continue to function by reducing the demands placed on resources.

However, legacy methods for deploying throttling solutions do not allow administrators to customize throttling policies and parameters to a sufficient degree. For example, an administrator using a legacy system cannot specify throttling parameters controlling a variety of throttling behaviors on a per-resource basis or on a per-origin basis.

Accordingly, a need exists to provide an improved approach for deploying a configurable throttling library in a cloud platform that throttles requests according to customizable parameters across each origin and resource. By throttling performance for certain users based on the specific behavior requested, throttling may minimize performance degradation in the system generally. This provides a further technical improvement of allowing throttling to occur only for the most demanding users of particular resources, ensuring consistent system performance for the bulk of a user base. Another technical benefit provided is that malicious actors and programs may be identified, tracked, and removed when customized policies are repeatedly violated.

FIG. 1 is a block diagram of cloud computing environment 100, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Cloud computing environment 100 may include origins 102, administrator 104, cloud platform 110, configuration agent 112, resources 114, throttling library 120, counter 122, delayer 124, policy repository 126, request executor 128, queue 130, and queue processor 132.

Origins 102, such as origin 102A, origin 102B, and origin 102C may be individuals interacting with applications hosted by a cloud platform. In such an embodiment, origin 102A may connect to a cloud platform, described below as cloud platform 110, using a computing device. Such a computer device may be personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. Origins 102 may also be other systems, services, APIs, or programmatic constructs connecting to cloud platform 110. Origins 102 may connect to cloud platform 110 using a suitable network such as the Internet, a local area network (LAN), a wide area network (WAN), a wireless network, a cellular network, or various other types of networks as would be appreciated by a person of ordinary skill in the art.

Administrator 104 may be an individual configuring cloud platform 110 to provide services and functionalities to users, such as origins 102, of software applications provided by cloud platform 110. One skilled in the relevant art(s) will appreciate that administrator 104 may perform a variety of functions to ensure that cloud platform 110 provides an acceptable user experience and meets service level agreements. For example, administrator 104 may configure throttling on cloud platform using throttling library 120, as described in further detail below.

Cloud platform 110 may provide tools that allow software applications to be built, deployed, and maintained by an organization or business. For example, cloud platform 110 may allow customers to create customer relationship management tools, enterprise resource planning tools, commerce applications, word processing applications, communication applications, product lifecycle management tools, supply chain management, general business solutions, and many other types of applications. Cloud platform 110 may include a user interface, device, application, or other system that collects, manipulates, stores, and/or archives data. Cloud platform 110 may provide stored data to applications through a suitable interface, API, querying mechanism, and/or other suitable protocol, for example, OData. Cloud platform 110 may employ a suitable application server, web server, or other mechanism for responding to web traffic received over appropriate communication channels. Cloud platform 110 may allow application developers to deploy applications written in the advanced business application programming language or other suitable high-level programming language, e.g., C/C++, Java, Perl, etc. Cloud platform 110 may divide business applications into a presentation layer (e.g., ASP, JSP, BSP, etc.), business-logic layer (e.g., J2EE runtime environment, java beans, etc.), integration layer (connecting to other application servers or APIs), connectivity layer (e.g., HTTP, HTTPS, SSL, etc.), persistence layer (e.g., SQL, etc.), and other suitable abstractions/layers. Cloud platform 110 may provide mechanisms to authenticate incoming web traffic, interact with backend systems to formulate appropriate responses, and return these responses to software applications. Cloud platform 110 may access a variety of backend systems, data storage solutions, services, APIs, and other systems, which will be referred to below as resources 114.

Configuration agent 112 may provide administrator 104 with mechanisms through which to configure throttling in cloud platform 110. Configuration agent 112 may allow administrator 104 to enable/disable throttling at runtime in respond to API usage that may different within an application from hour to hour. Configuration agent 112 may allow administrator 104 to set a throttling policy and throttling parameters associated with the throttling policy. For example, configuration agent 112 may allow administrator 104 to set a delay policy, a threshold policy, an expiration policy, a rejection policy, and other policies guiding the behavior of throttling within a cloud platform. As described below, cloud platform 110 may allow administrator 104 to configure the various policies on a per-origin and per-resource basis, allowing unique parameters to be set across all origins and resources in the system. Configuration agent 112 may provide a graphical user interface (GUI) through which to create throttling parameters, receive imported configuration files, and perform other suitable functions to facilitate the configuring of throttling parameters and policies.

Resources 114 may be a variety of backend systems, data storage solutions, services, web applications, servers, and other suitable resources accessed by origins 102 using cloud platform 110. In one embodiment, resources 114 may be housed within cloud platform 110 and accessed via suitable API calls. In another embodiment, resources 114 may be located outside of cloud platform 110 and accessed using suitable function or API calls via a suitable network, e.g., the Internet. For example, in an example cloud platform 110, an authorization server may access various APIs that perform tasks related to security token management, issuance, and verification. In such an example, separate resources 114 may be accessed by cloud platform 110 to perform these tasks on the authorization server.

Throttling library 120 may provide a highly configurable throttling mechanism within cloud platform 110. Throttling library 120 may be packed as a reusable and readily deployable library, e.g., throttling library 120 may be a Java servlet used to extend the capabilities of a web server or other web API. Throttling library 120 may interact with configuration agent 112 to receive an appropriate throttling policy and throttling parameters from administrator 104. Throttling library 120 may then serve as an intermediary between web requests to cloud platform 110 and resources 114. Throttling library 120 may throttle requests to resources 114 at appropriate times and in appropriate fashions in accordance with the configured parameters. Throttling library 120 may throttle requests across all origins and resources, i.e., the policy employed for requests from a first origin may differ from requests received from a second origin. Similarly, requests for a first resources may be configured to be treated differently from requests to a second resource. Throttling library 120 may include counter 122, delayer 124, policy repository 126, request executor 128, queue 130, and queue processor 132.

Counter 122 may be employed by throttling library 120 to track the number of requests made by origins 102 to resources 114. Counter 122 may employ an array or list of counters to track individual counts across all origins/resources. Each origin and resource may be assigned a quota, i.e., a permitted number of accesses, per a particular time interval. Counter 122 may track accesses/requests on an ongoing basis. Counter 122 may be accessed by throttling library 120 to determine if configured throttling policies have been triggered based on the number of requests to a resource from an origin. For example, if counter 122 exceeds a permitted request count within a permitted time period, then throttling may commence for a particular origin and/or resource.

Delayer 124 may be employed by throttling library 120 to cause a delay in the processing of a request once throttling commences for a particular origin and/or resource. Delayer 124 may cause a delay to occur based on specified values in a delay policy, described below as delay policy 202. For example, delayer 124 may cause an initial delay to occur in accordance with a specified initial delay interval. Delayer 124 may increase the delay upon subsequent requests from the same origin to the same resource, e.g., delayer 124 may increase the delay by a configured increment value. Thus, delayer 124 may increase subsequent delays. Delayer 124 may further consult a rejection policy to determine criteria upon which requests from an origin to a resource are rejected entirely. Such a circumstance may arise in the context of a malicious actor or malicious software.

Policy repository 126 may be stored within throttling library 120. Policy repository 126 may be received from administrator 104 via configuration agent 1112. Policy repository 126 may guide the behavior of throttling within cloud platform 110. Policy repository 126 may include a delay policy, threshold policy, expiration policy, rejection policy, etc. These policies are described in further detail below with reference to FIG. 2. Policy repository 126 may be a database, flat file, external service, or any other kind of persistent storage. Policy repository 126 may further store an increment policy and a decrement policy. An increment policy may include a time interval and a permitted access count on a per-resource and/or per-origin basis used in determining whether requests should be throttled, as described in further detail below with reference to FIG. 3. A decrement policy may specify a decrement interval and a decrement value used to decrement request counts over time.

Request executor 128 may be employed by throttling library 120 to carry out functions related to throttling. Request executor 128 may consult policy repository 126 to retrieve policies 200. Request executor 128 may determine if throttling is appropriate and enable or disable throttling under appropriate circumstances. Request executor 128 may cause a delay to be associated with a request prior to placing the request in queue 130 for processing. In an alternate embodiment, request executor 128 may apply a calculated delay prior to placing a request in queue 130 for processing.

Queue 130 may be used by throttling library 120 to store requests for processing. By employing queue 130, throttling library 120 may avoid tying up processing threads with delayed requests. Accordingly, requests are placed into queue 130 and processed by a separate thread. In an embodiment, queue 130 may be increased or decreased in size and processing power in real time by administrator 104 via configuration agent 112.

Queue processor 132 may process requests in queue 130. Queue processor 132 may send the request to a resource among resources 114, receive a response, and return the response to request executor 128 to send to the requesting origin. In an embodiment, queue processor 132 may employ asynchronous request processing to avoid running out of memory or other system resources. In such an embodiment, queue processor 132 may limit the elements stored in queue 130.

Figure 2:
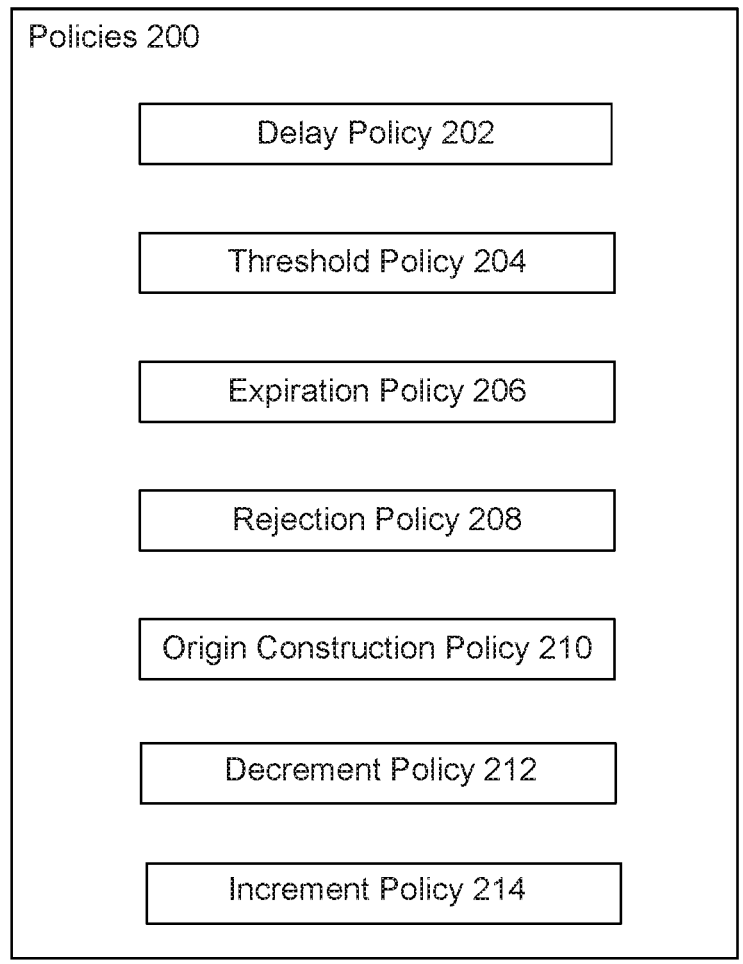
FIG. 2 is a block diagram of throttling policies in a throttling library employed in a cloud computing environment, according to some embodiments.

FIG. 2 is a block diagram of throttling policies 200 in a throttling library employed in a cloud computing environment, according to some embodiments. Any operation herein may be performed by any type of structure in the diagram, such as a module or dedicated device, in hardware, software, or any combination thereof. Any block in the block diagram of FIG. 2 may be regarded as a module, apparatus, dedicated device, general-purpose processor, engine, state machine, application, functional element, or related technology capable of and configured to perform its corresponding operation(s) described herein. Throttling policies 200 may include delay policy 202, threshold policy 204, expiration policy 206, rejection policy 208, origin construction policy 210, decrement policy 212, and increment policy 214.

Delay policy 202 may be configured by administrator 104 via configuration agent 112 to determine the behavior of throttling library 120 with respect to delays applied to throttled requests. Delay policy 202 may specify an initial delay that occurs when throttling initially commences. Delay policy 202 may also specify an increment value, which is applied by delayer 124 upon subsequent requests. In this fashion, delay policy 202 may increase the duration of a delay when multiple requests from the same origin to the same resource are received. Delay policy 202 may store unique values for the initial delay and the increment value across origins 102 and resources 114. Accordingly, the delay applied to one origin/resource may differ from the delay applied to a second origin/resource in accordance with an organization's needs.

Threshold policy 204 may be configured by administrator 104 via configuration agent 112 to determine the behavior of throttling library 120 with respect to threshold criteria. Threshold policy 204 may specify criteria upon which throttling is to commence. For example, the criteria may involve resource consumption/availability as indicated by monitored CPU and memory utilization. For another example, the criteria specified by threshold policy 204 may be configured by administrator 104 to occur during certain times/days/weeks. Threshold policy 204 may also specify criteria that are action-based, i.e., throttling should only occur when certain actions or requests are performed. Moreover, threshold policy 204 may store unique criteria across origins 102 and resources 114. Accordingly, throttling may commence upon different criteria being met for a first origin/resource as compared to a second origin/resource in accordance with an organization's needs. In one embodiment, threshold policy 204 may specify that throttling should occur only upon express enabling of the feature by administrator 104 via configuration agent 112.

Expiration policy 206 may be configured by administrator 104 via configuration agent 112 to determine the behavior of throttling library 120 with respect to the expiration of throttling. Expiration policy 204 may specify criteria upon which throttling is to cease. For example, the criteria may describe resource consumption/availability as indicated by monitored CPU and memory utilization. Expiration policy 206 may store unique criteria across origins 102 and resources 114. Accordingly, throttling may cease upon different criteria being met for a first origin/resource as compared to a second origin/resource in accordance with an organization's needs. In one embodiment, expiration policy 206 may specify that throttling should occur only upon express disabling of the feature by administrator 104 via configuration agent 112. Additionally, expiration policy 206 may specify a time period upon which a request count for an origin/resource should be zeroed. For example, administrator 104 may specify in expiration policy 206 if no requests are received from a particular origin to a particular resource within 5 minutes, then the request count should be zeroed for that resource/origin. In this fashion, expiration policy 206 may function in tandem with a decrement policy specified in the throttling parameters to reduce a counter for a resource/origin.

Rejection policy 208 may be configured by administrator 104 via configuration agent 112 to determine the behavior of throttling library 120 with respect to when requests from a particular origin to a particular resource should be disabled, i.e., rejected outright as opposed to delayed. Rejection policy 208 may specify criteria upon which requests will be rejected from a resource to an origin. For example, rejection policy 208 may list a number of delays, a time period of being delayed, etc. that when met results in delayer 124 rejecting requests during throttling as opposed to delaying them.

Origin construction policy 210 may be configured by administrator 104 via configuration agent 112 to determine the behavior of throttling library 120 with respect to how origins are defined. For example, origin construction policy 210 may store custom code created by administrator 104 that defines origins for a particular customer. For example, throttling library 120 may provide an extendable abstract class that may be overridden with custom code, as displayed in the merely exemplary OriginFactory abstract class below:

```
public class Api1 extends ThrottlingAPI {
    ... code omitted ...
    @Override
    protected OriginFactory createOriginFactory( ) {
        return new CustomOriginFactory( );
    }
}
```

In such a custom class, a customer could implement a solution that directly rejects a call for which the identifier could not be resolved, substitute an appropriate default global identifier, or otherwise modify the default system behavior.

Decrement policy 212 may be configured by administrator 104 via configuration agent 112 to determine the behavior of throttling library 120 with respect to how a request count associated with an origin and/or resource is decremented over time. Decrement policy 212 may specify a decrement interval and a decrement value. Throttling library 120 may then decrement request counts tracked for an origin/resource by reducing the count by the decrement value in accordance with the decrement interval. For example, decrement policy 212 may specify that for a resource/origin, the decrement interval should be one per second and the decrement value should be one. In such an example, throttling library 120 may decrement the request count for the appropriate origin/resource by one every second. In this fashion, the request count may both increase as requests are received, but also decrease in accordance with decrement policy 212.

Increment policy 214 may be configured by administrator 104 via configuration agent 112 to determine the behavior of throttling library 120 with respect to the permitted request count and a time interval for origins and resources. The permitted request count may be an integer value that specifies a number of requests from a particular origin to a particular resource. When the permitted request count is reached, requests from that origin to the resource may be delayed in accordance with delay policy 202.

Figure 3:
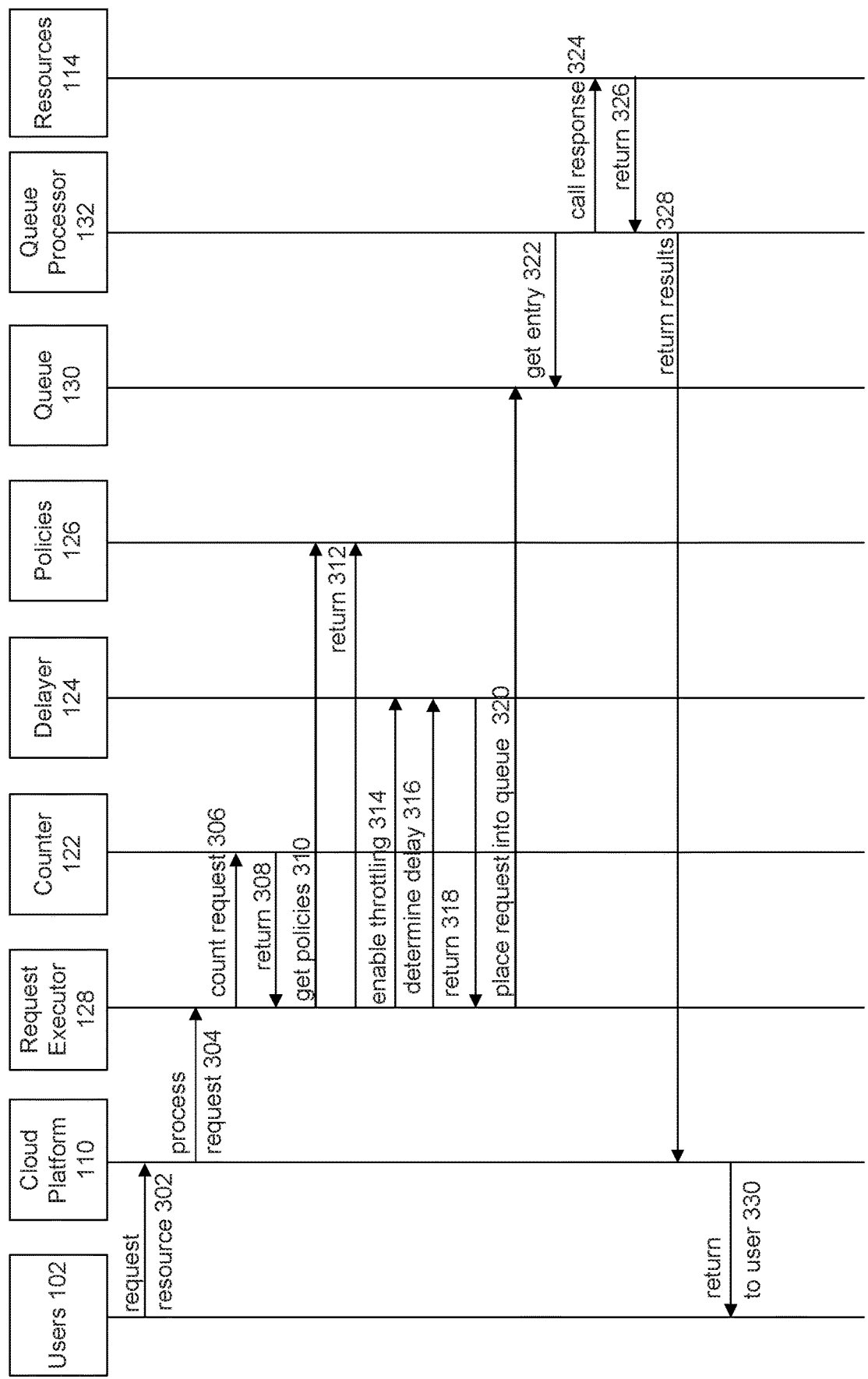
FIG. 3 is a flowchart illustrating a method of processing a request to a resource in a cloud platform using a deployable throttling library, according to some embodiments.

FIG. 3 is a flowchart illustrating a method of processing a request to a resource in a cloud platform using a deployable throttling library, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, cloud platform 110 may receive a request to a resource from an origin among origins 102. For example, cloud platform 110 may receive a web request via an appropriate network protocol, e.g., an HTTP request. The request may identify the functions or actions to perform and parameters associated with those functions/actions. For example, if throttling library 120 is installed on an authorization server, the request may be an authorization request directed from origins 102 to the authorization server with parameters included to determine an appropriate action. Cloud platform 110 may subsequently cause request executor 128 to determine if throttling is enabled and/or should be enabled and then delay/reject the reply in accordance with configured policies if throttling is applicable. This general process is described in further detail in the subsequent steps.

In 304, cloud platform 110 may engage request executor 128 to process the request received in 302. Request executor 128 may parse the request and determine appropriate behaviors/actions based on the received request. For example, request executor 128 may identify the origin, parameters, and actions to perform. The origin may be identified using a variety of suitable programmatic approaches, e.g., by IP address, device ID, referrer, etc. In an embodiment, request executor 128 may access origin construction policy 210 to determine the origin in a customizable, programmatic fashion that is unique to the customer and/or application. In this fashion, administrator 104 may further customize their application to group origins/users/referrers and determine the origin in a manner that uniquely meets their needs. For example, if throttling library 120 is installed on an authorization server and the request is an authorization request, request executor 128 may determine an appropriate API request included in the authorization request, e.g., token issuance, token verification, etc.

In 306, request executor 128 may engage counter 122 to count the request. The request may be counted for the particular origin from which the request was received and the particular resource implicated in the request. Counter 122 may maintain separate counters for each origin from which a request is received and each resource that a request accesses. Thus, counter 122 may increment the appropriate counter (associated with that resource/origin). Counter 122 may also decrement stored per-origin/per-resource counters in accordance with the decrement value and decrement interval as specified in decrement policy 212. In some embodiments, counter 122 may clear the counter or set the counter to one if an appropriate amount of time has passed since the last request in accordance with expiration policy 206. In other embodiments, this behavior may be completed by request executor 128 upon determining the delay, described in further detail below. In some embodiments, administrator 104 may further provide a custom calculation algorithm for counter decrementing, i.e., specialized code that determines the manner in which the counter is decremented as time passes.

In 308, counter 122 may return the retrieved count, incremented and/or decremented as appropriate, to request executor 128. Counter 122 may pass an integer value, pointer to a variable, or other suitable return mechanism as will be understood by one skilled in the relevant art(s).

In 310, request executor 128 may retrieve the policies applicable to the origin from which the request was received and the resource to which the request is directed. Request executor 128 may retrieve delay policy 202, threshold policy 204, expiration policy 206, rejection policy 208, origin construction policy 210, and any other suitable policies from policy repository 126. Request executor 128 may form an appropriate API or function call to policies repository 126 to initiate the request.

In 312, policy repository 126 may return the retrieved policies to request executor 128. Policy repository 126 may return the policies as variables, pointers, JSON or other human-readable, machine-interpretable files, or any other suitable manner.

In 314, request executor 128 may determine if throttling is enabled, needs to be enabled, or needs to be disabled based on threshold policy 204, expiration policy 206, and increment policy 214. Request executor 128 may first determine if throttling is enabled generally and then also whether throttling is or should be enabled for the particular resource/origin based on the permitted request count.

To determine if throttling needs to be enabled generally, request executor 128 may examine threshold policy 204 to determine criteria upon which throttling is to be enabled. For example, criteria may be performance based, metric based, time/date based, etc. Request executor 128 may then determine if the criteria is presently met. In one embodiment, request executor 128 may store a throttling enabled variable or other suitable construct indicating that throttling is enabled. In such an embodiment request executor 128 may enable the value when it is determined that the criteria has been met and consult this flag for subsequent requests. Request executor 128 may then disable the throttling when criteria specified in expiration policy 206 is met.

Request executor 128 may then determine if throttling is enabled or needs to be enabled for the particular resource being requested from the origin. Request executor 128 may examine the permitted request count specified in increment policy 214 and the counter returned from counter 122. If the counter exceeds the permitted request count, then throttling may be commenced and a delay/rejection determined in subsequent steps 316 and 318. If throttling is disabled or the criteria specified in threshold policy 204 is not met, then no delay/rejection needs to be determined in subsequent steps 316 and 318, and method 300 may proceed to place the request in queue 130 in 320. In some embodiments, administrator 104 may further provide a custom calculation algorithm for determining whether throttling is to be enabled on a per-origin basis. For example, the merely exemplary code below displays a ThresholdPolicy that may be overridden:

```
public class CustomAccessorFactory extends PolicyAccessorFactory {
    ... code omitted ...
    @Override
    public PolicyAccessor<ThresholdPolicy>
    createAvailableProcessorsThresholdPolicyAccessor( ) {
        return new CustomThresholdPolicyAccessor( );
    }
}
```

In 316, request executor 128 may engage delayer 124 to determine a delay to attribute to the request based on the policies retrieved. Delayer 124 may consult delay policy 202 retrieved from policies 200. Delay policy 202 may specify an initial delay interval and an increment value. Delayer 124 may also examine rejection policy 208 to determine a point at which to reject request. Because an origin may send a massive amount of requests accidentally or maliciously, requests from the origin may need to be rejected entirely permanently or for a configurable period of time. Thus, delayer may examiner rejection policy 208 to determine criteria which when met may result in requests from an origin to a resource being rejected entirely. For example, if a certain number of requests are throttled or if a delay is applied to requests a configurable number of times, then subsequent requests may be throttled. Rejection policy 208 may further specify criteria upon which to restore service to the origin and/or resource. The delay policy may be overridden in a fashion similar to the threshold and counter policies described above.

In 318, delayer 124 may return the appropriate delay to request executor 128. Delayer 124 may return the appropriate delay as an integer or other variable, pointer, JSON or other human-readable, machine-interpretable files, or any other suitable manner.

In 320, request executor 128 may place the request into queue 130. In one embodiment, request executor 128 may include metadata along with the request and associated with the request that indicates the delay to be applied, i.e., the delay returned in steps 316 and 318. In another embodiment, request executor 128 may enforce the calculated throttling delay prior to placing the request into queue 130.

In 322, queue processor 132 may retrieve the next entry in queue 130 for processing. In one embodiment, queue processor 132 may apply a delay associated with the request prior to processing the request in subsequent steps. In another embodiment, request executor 128 applied the delay previously and thus queue processor 132 may process the requests in the queue in the most suitable, expedient manner.

In 324, queue processor 132 may pass the request to the appropriate resource among resources 114. Queue processor 132 may route an API call, function call, etc. to resources 114 based on the request received from origins 102.

In 326, resources 114 may return an appropriate response to queue processor 132 via an appropriate communication channel, which return the results to cloud platform 110 in 328, which returns the results of the resource request to the requesting origin in 330.

Figure 4:
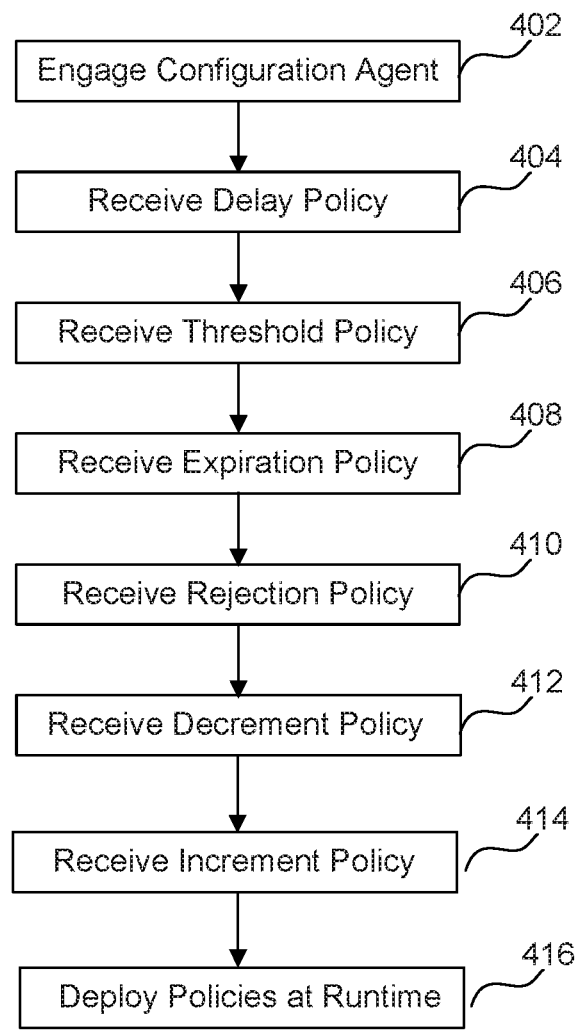
FIG. 4 is a flowchart illustrating a method of receiving policies from an administrator using a configuration agent, according to some embodiments.

FIG. 4 is a flowchart illustrating a method of receiving policies from an administrator using a configuration agent, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, cloud platform 110 may engage configuration agent 112 to receive a throttling policy and customized throttling parameters from administrator 104. In one embodiment, configuration agent 112 may provide a GUI by which to provide the customized throttling parameters. In another embodiment, configuration agent 112 may receive a flat file or other import file that includes the throttling parameters.

In 404, cloud platform 110 may engage configuration agent 112 to receive a delay policy. Configuration agent 112 may receive from administrator 104 an initial delay that occurs when throttling initially commences. Administrator 104 may also specify an increment value to apply to subsequent delays, where the subsequent delay may the initial delay incremented by the increment value. Administrator 104 may specify the increment value and the initial delay uniquely for each origin and resource, i.e., origins 102 and resources 114.

In 406, cloud platform 110 may engage configuration agent 112 to receive a threshold policy. Administrator 104 may specify criteria upon which throttling is to commence. The criteria may include performance benchmarks, time- or date-based criteria, action-based criteria, or other suitable triggers. For example, administrator 104 may consider a number of threads running concurrently. Administrator 104 may specify the criteria uniquely for each origin and resource, i.e., origins 102 and resources 114. Administrator 104 may also specify an expiration policy, which provides criteria under which throttling is to cease, as described above as expiration policy 206.

In 408, cloud platform 110 may engage configuration agent 112 to receive a variety of overrides to the policies. These overrides may be specified on a per-origin and per-resource basis and allow administrator 104 to programmatically change the throttling behavior for each origin. For example, administrator 104 may specify origin policies, throttling policies, delay policies, etc. using the overrides.

In 410, cloud platform 110 may engage configuration agent 112 to receive a rejection policy. Administrator 104 may configure criteria that determine the behavior of throttling library 120 with respect to when requests from a particular origin to a particular resource should be disabled, i.e., rejected outright as opposed to delayed. Administrator 104 may specify criteria upon which requests will be rejected from a resource to an origin. For example, administrator 104 may specify a number of delays, a time period of being delayed, etc. that when met results in delayer 124 rejecting requests during throttling as opposed to delaying them.

In 412, cloud platform 110 may engage configuration agent 112 to receive a decrement policy, such as decrement policy 212 described above. The received decrement policy may provide a decrement value and a decrement interval. Throttling library 120 may reduce the request count for an origin/resource by the decrement value with a frequency specified by the decrement interval.

In 414, cloud platform 110 may engage configuration agent 112 to receive an increment policy, such as increment policy 214 described above. The increment policy may specify a permitted request count for a resource and/or origin. The increment policy may further include a time interval, which represents a length of time during which the permitted request count is applied.

In 416, cloud platform 110 may deploy these policies to the runtime environment. For example, administrator 104 may select a deploy command or other suitable command in configuration agent 112 to confirm the release of the updated policies and overrides. Cloud platform may engage configuration agent 112 to complete the deployment.

In the foregoing fashion, cloud platform 110 may receive a throttling policy that includes various parameters that specify configurations for throttling unique to origins that access cloud platform 110 and resources accessed by cloud platform 110 to service the requests from origins 102.

Figure 5:
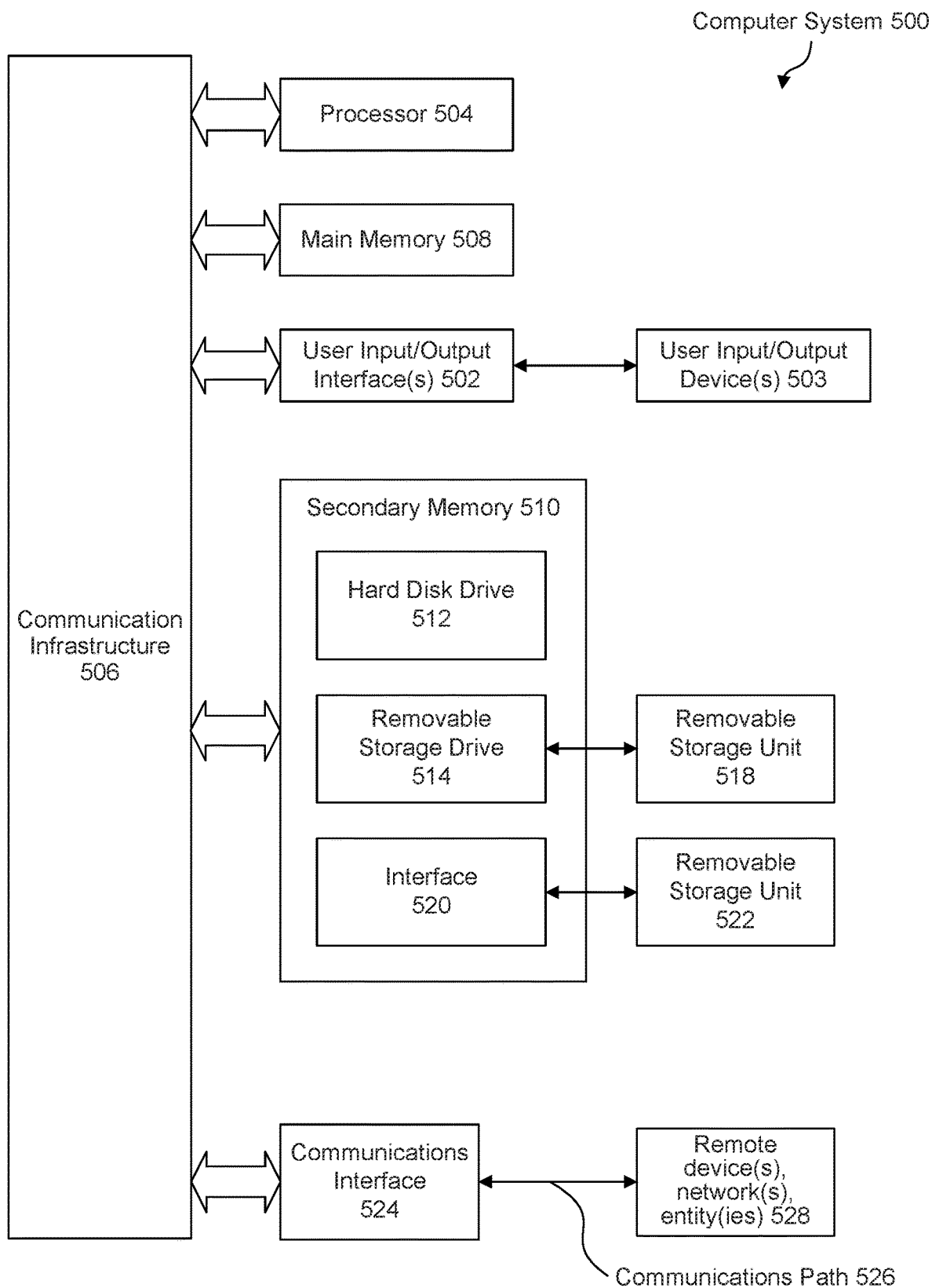
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    displaying, by one or more processors, a throttling library on a user interface, wherein the throttling library comprises functions configured to customize throttling parameters and throttling policies for origins to resources, wherein the throttling library is an intermediary between web requests to a cloud platform and the resources and wherein the throttling parameters specify configurations for throttling unique to the origins that access the cloud platform and resources accessed by the cloud platform to service web requests from the origins;

deploying, by the one or more processors, a throttling policy that specifies throttling parameters for web requests from origins to resources in the cloud platform;

receiving, by the one or more processors, an input from the user interface, wherein the input comprises the throttling parameters customized based on an origin that accesses the cloud platform and a resource accessed by the cloud platform to service web requests from the origins;

receiving, by the one or more processors, a web request from the origin to access the resource;

determining, by the one or more processors, a permitted request count and a time interval specified in the throttling parameters applicable to the web request based on the origin and the resource;

incrementing, by the one or more processors, a request count associated with the origin and the resource; and causing, by the one or more processors, a delay in the processing of the web request based on the throttling policy when the request count exceeds the permitted request count in the time interval.

2. The computer-implemented method of claim 1, further comprising:

determining, by the one or more processors, a decrement policy specified in the throttling parameters comprising a decrement interval and a decrement value; and decrementing, by the one or more processors, the request count by the decrement value in accordance with the decrement interval.

3. The computer-implemented method of claim 1, further comprising:

determining, by the one or more processors, a delay policy specified in the throttling parameters comprising an initial delay interval and an increment value that increases the delay upon subsequent web requests; and causing, by the one or more processors, a second delay in the processing of a second web request, wherein the second delay is the initial delay interval incremented by the increment value.

4. The computer-implemented method of claim 1, further comprising:

determining, by the one or more processors, a threshold policy specified in the throttling parameters comprising a criterion upon which to begin throttling;

monitoring, by the one or more processors, the resource to determine when the criterion is met; and commencing, by the one or more processors, throttling when the criterion is met.

5. The computer-implemented method of claim 1, further comprising:

determining, by the one or more processors, an expiration policy specified in the throttling parameters comprising a criterion upon which to disable throttling;

monitoring, by the one or more processors, the resource to determine when the criterion is met; and disabling, by the one or more processors, throttling when the criterion is met.

6. The computer-implemented method of claim 1, further comprising:

determining, by the one or more processors, a rejection policy specified in the throttling parameters comprising a criterion upon which to disable access from the origin to the resource; and disabling, by the one or more processors, access from the origin to the resource when the criterion is met.

7. The computer-implemented method of claim 1, further comprising:

placing, by the one or more processors, the web requests in a queue for processing; and causing, by the one or more processors, a worker thread to process the web requests in the queue by:
passing the web request to the resource;
receiving a response from the resource; and
returning the response to the origin.

8. The computer-implemented method of claim 1, further comprising:

receiving, by the one or more processors, override code that overrides the origins by providing a customized origin construction; and incorporating, by the one or more processors, the customized origin construction into the throttling parameters.

9. A system, comprising:

a memory; and at least one processor coupled to the memory and configured to:

display a throttling library on a user interface, wherein the throttling library comprises functions configured to customize throttling parameters and throttling policies for origins to resources, wherein the throttling library is an intermediary between web requests to a cloud platform and the resources and wherein the throttling parameters specify configurations for throttling unique to the origins that access the cloud platform and resources accessed by the cloud platform to service web requests from the origins;

deploy a throttling policy that specifies throttling parameters for web requests from origins to resources in the cloud platform;

receive an input from the user interface, wherein the input comprises the throttling parameters customized based on an origin that accesses the cloud platform and a resource accessed by the cloud platform to service web requests from the origins;

receive a web request from the origin to access the resource;

determine a permitted request count and a time interval specified in the throttling parameters applicable to the web request based on the origin and the resource;

increment a request count associated with the origin and the resource; and cause a delay in the processing of the web request based on the throttling policy when the request count exceeds the permitted request count in the time interval.

10. The system of claim 9, the at least one processor further configured to:

determine a decrement policy specified in the throttling parameters comprising a decrement interval and a decrement value; and decrement the request count by the decrement value in accordance with the decrement interval.

11. The system of claim 9, the at least one processor further configured to:

determine a delay policy specified in the throttling parameters comprising an initial delay interval and an increment value that increases the delay upon subsequent web requests; and cause a second delay in the processing of a second web request, wherein the second delay is the initial delay interval incremented by the increment value.

12. The system of claim 9, the at least one processor further configured to:

determine a threshold policy specified in the throttling parameters comprising a criterion upon which to begin throttling;
monitor the resource to determine when the criterion is met; and
commence throttling when the criterion is met.

13. The system of claim 9, the at least one processor further configured to:
determine an expiration policy specified in the throttling parameters comprising a criterion upon which to disable throttling;
monitor the resource to determine when the criterion is met; and
disable throttling when the criterion is met.

14. The system of claim 9, the at least one processor further configured to:
determine a rejection policy specified in the throttling parameters comprising a criterion upon which to disable access from the origin to the resource; and
disable access from the origin to the resource when the criterion is met.

15. The system of claim 9, the at least one processor further configured to:
place the web requests in a queue for processing; and
cause a worker thread to process the web requests in the queue by:
passing the web request to the resource;
receiving a response from the resource; and
returning the response to the origin.

16. The system of claim 9, the at least one processor further configured to:
receive override code that overrides the origins by providing a customized origin construction; and
incorporate the customized origin construction into the throttling parameters.

17. A non-transitory computer-readable device having instructions stored thereon that, when executed by at least one computing device, cause the at least one computing device to perform operations comprising:
displaying a throttling library on a user interface, wherein the throttling library comprises functions configured to customize throttling parameters and throttling policies for origins to resources, wherein the throttling library is an intermediary between web requests to a cloud platform and the resources and wherein the throttling parameters specify configurations for throttling unique to the origins that access the cloud platform and resources accessed by the cloud platform to service web requests from the origins;
deploying a throttling policy that specifies throttling parameters for web requests from origins to resources in the cloud platform;
receiving an input from the user interface, wherein the input comprises the throttling parameters customized based on an origin that accesses the cloud platform and a resource accessed by the cloud platform to service web requests from the origins;
receiving a web request from the origin to access the resource;
determining a permitted request count and a time interval specified in the throttling parameters applicable to the web request based on the origin and the resource;
incrementing a request count associated with the origin and the resource; and
causing a delay in the processing of the web request based on the throttling policy when the request count exceeds the permitted request count in the time interval.

18. The non-transitory computer-readable device of claim 17, the operations further comprising:
determining, by the one or more processors, a decrement policy specified in the throttling parameters comprising a decrement interval and a decrement value; and
decrementing, by the one or more processors, the request count by the decrement value in accordance with the decrement interval.

19. The non-transitory computer-readable device of claim 17, the operations further comprising:
determining a delay policy specified in the throttling parameters comprising an initial delay interval and an increment value that increases the delay upon subsequent web requests; and
causing a second delay in the processing of a second web request, wherein the second delay is the initial delay interval incremented by the increment value.

20. The non-transitory computer-readable device of claim 17, the operations further comprising:
determining a threshold policy specified in the throttling parameters comprising a criterion upon which to begin throttling;
monitoring the resource to determine when the criterion is met; and
commencing throttling when the criterion is met.

\* \* \* \* \*